United States Patent
Sangameswaran et al.

(10) Patent No.: US 10,367,889 B2
(45) Date of Patent: Jul. 30, 2019

(54) SMART ROUTING FOR ON-VEHICLE TELEMATICS PROTOCOL

(71) Applicant: FORD GLOBAL TECHNOLOGIES, LLC, Dearborn, MI (US)

(72) Inventors: Sangeetha Sangameswaran, Canton, MI (US); Jason Michael Miller, Woodhaven, MI (US); Eric Ramsay Paton, Sylvan Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 77 days.

(21) Appl. No.: 15/434,120

(22) Filed: Feb. 16, 2017

(65) Prior Publication Data

US 2018/0234498 A1     Aug. 16, 2018

(51) Int. Cl.
| | | |
|---|---|---|
| H04L 12/28 | (2006.01) |
| H04L 29/08 | (2006.01) |
| H04L 12/18 | (2006.01) |
| H04L 12/413 | (2006.01) |
| H04L 12/46 | (2006.01) |
| H04L 12/40 | (2006.01) |
| H04L 29/12 | (2006.01) |

(52) U.S. Cl.
CPC .............. *H04L 67/12* (2013.01); *H04L 12/18* (2013.01); *H04L 12/413* (2013.01); *H04L 12/4625* (2013.01); *H04L 61/6027* (2013.01); *H04L 61/6095* (2013.01); *H04L 2012/40215* (2013.01); *H04L 2012/40273* (2013.01)

(58) Field of Classification Search
CPC ....................................................... H04J 12/28
USPC ........................................................ 370/329
See application file for complete search history.

(56) References Cited

U.S. PATENT DOCUMENTS

| | | | |
|---|---|---|---|
| 2013/0166778 A1 | 6/2013 | Ishigooka et al. |
| 2014/0379954 A1 | 12/2014 | Hayashi |
| 2015/0207858 A1 | 7/2015 | De Bes |
| 2017/0328995 A1* | 11/2017 | Marschalkowski ... | G01S 13/878 |

* cited by examiner

*Primary Examiner* — Dang T Ton
(74) *Attorney, Agent, or Firm* — Frank Lollo; Brooks Kushman P.C.

(57) ABSTRACT

A vehicle system includes a gateway including a database and configured to transfer messages between a plurality of controllers, each controller connected to one of a plurality of nodes, the gateway further configured to broadcast, to all the nodes, a request message received from a first controller for receipt by a second controller, receive, from a first node, a response message from the second controller for receipt by the first controller, and link, in the database, the first node and the second controller.

20 Claims, 11 Drawing Sheets

SMART ROUTING FOR ON-VEHICLE TELEMATICS PROTOCOL

TECHNICAL FIELD

The present disclosure relates to systems and methods for routing a data message in a controller area network (CAN) based on a dynamically updated routing table.

BACKGROUND

Vehicle telematics systems have added a powerful tool to the vehicular computing arsenal. Using a telematics control unit (TCU) and a wirelessly connected device (such as a cell phone) or on-board modem, a vehicle can access a variety of data that is stored remotely from the vehicle. At the same time, the vehicle can run off-board diagnostics, file updates, error checking and general system queries. Many off-board access requests require or request some data typically available over a vehicle CAN bus. The CAN bus connects a variety of vehicle controllers, allowing communication among controllers and further providing data resources (such as data from controllers) to remote system queries.

Implementing CAN as a main communication method on modern vehicles may necessitate taking into account bandwidth limitations of a network physical layer, multiple baud rates of the network topology and variation in subnet layouts for similar vehicle controllers implemented on different vehicle makes and models. In one example, the vehicle controllers may communicate using the same or different subnets and connection speeds. If gateways, or senders, route messages based on a predefined message type, the message type may need to be reconfigured for each vehicle configuration to ensure it reaches an intended destination. As another example, routing network messages using pre-assigned subnets may reduce flexibility in implementing a common communication system across different vehicle configurations.

Additions to a variety of implementations for the CAN bus in conjunction with the TCU, such as firmware updates and new telematics features, may exhaust the usable network 11-bit IDs. Improved transfer protocols address and work with existing limitations to allow for improved functionality and communication across a variety of subnets.

SUMMARY

A vehicle system includes a gateway including a database and configured to transfer messages between a plurality of controllers, each controller connected to one of a plurality of nodes, the gateway further configured to broadcast, to all the nodes, a request message received from a first controller for receipt by a second controller, receive, from a first node, a response message from the second controller for receipt by the first controller, and link, in the database, the first node and the second controller.

A method includes broadcasting, to all vehicle network nodes, each connecting one of a plurality of controllers, a request message received from a first controller and directed to a second controller, receiving, from a first node, a response message sent by the second controller and directed to the first controller, and linking the first node to the second controller.

A system for a vehicle includes a gateway controller connected, via nodes, to a pair of a plurality of vehicle controllers to transfer request and response message frames therebetween and configured to: receive, from a first controller, the request message frame directed to a second controller, query a database to identify the node connected to the second controller and linked, in the database, to the second controller based on a previously received response message frame from the second controller, and send the request message frame to the identified node.

DETAILED DESCRIPTION

Figure 1:
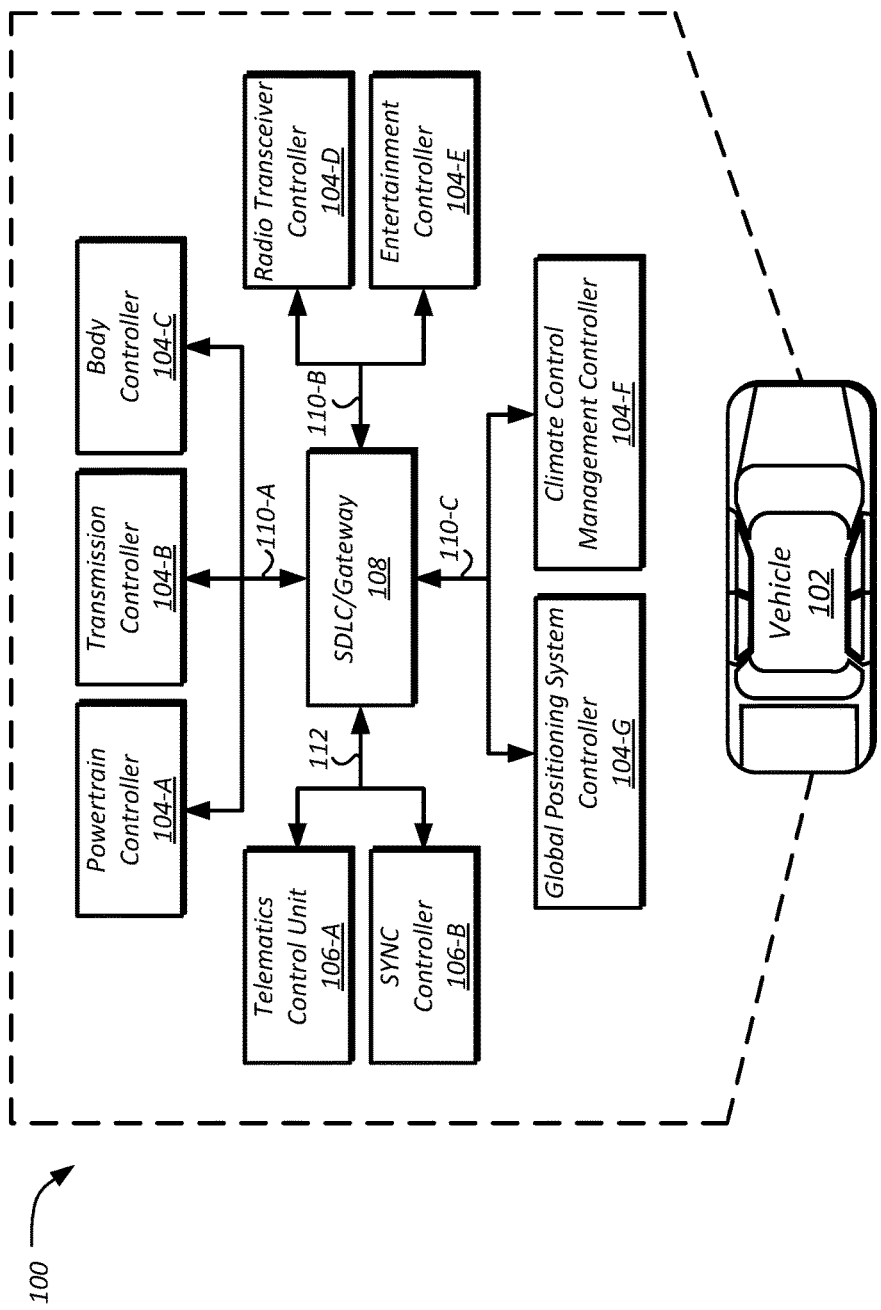
FIG. 1 is a block diagram illustrating an example vehicle communication network.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle controllers may be configured to communicate using one or more in-vehicle networks, such as, but not limited to, controller area network (CAN), medial oriented systems transport (MOST), Ethernet, FlexRay, local interconnect network (LIN), and so on. The in-vehicle network communication may include sending and receiving a plurality of data messages. The in-vehicle network gateway may receive communication messages originating at one in-vehicle controller for receipt and processing by another in-vehicle controller.

The CAN bus may comprise a single twisted pair of wires that connect all controllers of a given vehicle on the network together. The CAN bus interface of each corresponding controller may be responsible for routing a data message from a sending controller to a receiving controller. A unique priority/identifier field of a CAN message may provide far more in prioritizing various messages and may allow high priority messages to overwrite lower priority messages electrically, such as by grounding out the lower priority data signals.

In one example, a network gateway controller may be configured to route messages being exchanged by the controllers based on a routing table stored in gateway storage. The routing table may include a listing of unique identifiers and corresponding subnet identifiers. Each of the unique identifiers may define a vehicle controller and each subnet identifier may define a portion of the network to which the controller is connected.

The gateway controller may be configured to dynamically update the routing table in response to receiving a CAN message that originated at a source controller and is intended for receipt by a target controller. As an example, the CAN message, such as, for example, a request sent from one vehicle controller to another, may include a message identifier. The gateway controller may interpret the message identifier to discern the source controller and a source controller subnet, as well as, the target controller to which the received message is to be delivered. The gateway controller may, accordingly, dynamically update the routing table to link an identifier of the source controller to an identifier of the source controller subnet and that subsequent messages directed to the source controller, e.g., when the source controller becomes a target, may be sent directly to the source controller subnet and not to all network subnets.

In response to routing a received request from a source controller to a target controller, the gateway controller may receive a response CAN message directed from a previously target controller, i.e., presently a source controller, to a former source controller, i.e., identified now as a target controller. The gateway controller may be configured to dynamically update the routing table based on the received response message, in response to detecting that a controller identifier of the source controller that is sending the response message corresponds to a controller identifier of the target controller of the request message.

FIG. 1 illustrates an example in-vehicle network 100 for establishing communication between a plurality of vehicle controllers 104 of a vehicle 102, each connected to one of a plurality of subnets 110. The network 100 may include a telematics control unit (TCU) 106-A and a vehicle communication system (SYNC) controller 106-B that are configured to, together or separately, facilitate communication between various components of the vehicle 102 and those of other vehicles 102 and/or mobile devices via external and in-vehicle networks (not shown). The TCU 106-A and the SYNC controller 106-B (hereinafter, backbone controllers 106) may be connected to a backbone 112 portion of the in-vehicle network 100 and may communicate with each other and/or with the controllers 104. While an example network 100 is shown in FIG. 1, the example components illustrated in the Figure are not intended to be limiting. Indeed, the network 100 may have more or fewer components, and additional or alternative components and/or implementations may be used. As an example, the controllers 104 and the backbone controllers 106 may each be connected to one or more same or different types of nodes as the subnets 110 and the backbone 112.

The vehicle 102 includes a vehicle, such as, but not limited to, various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the operating characteristics of the vehicle may correspondingly vary. As some other possibilities, vehicle may have different characteristics with respect to passenger capacity, towing ability and capacity, and storage volume.

The vehicle controllers 104 may include various hardware and software components and may be configured to monitor and manage various vehicle functions under the power of the vehicle 102 battery and/or drivetrain. The controllers 104 may, accordingly, include one or more processors (e.g., microprocessors) (not shown) configured to execute firmware or software programs stored on one or more storage devices (not shown) of the controller 104. While the controllers 104 are illustrated as separate components, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

The vehicle controllers 104 may, for example, include, but are not limited to, a powertrain controller 104-A configured to manage operating components related to one or more vehicle sources of power, such as engine, battery, and so on, a transmission controller 104-B configured to manage power transfer between vehicle powertrain and wheels, a body controller 104-C configured to manage various power control functions, such as exterior lighting, interior lighting, keyless entry, remote start, and point of access status verification, a radio transceiver controller 104-D configured to communicate with key fobs, mobile devices, or other local vehicle 102 devices, an entertainment controller 104-E configured to support voice command and BLUETOOTH interfaces with the driver and driver carry-on devices, a climate control management controller 104-F configured to monitor and manage heating and cooling system components (e.g., compressor clutch, blower fan, temperature sensors, etc.), and a global positioning system (GPS) controller 104-G configured to provide vehicle location information.

The backbone controllers 106, e.g., the TCU 106-A and the SYNC controller 106-B, may each include one or more processors (not shown) (e.g., microprocessors) configured to execute firmware or software programs stored on one or more respective storage devices of the TCU 106-A and the SYNC controller 106-B. The TCU 106-A and the SYNC controller 106-B may each further include network hardware, e.g., the modem, configured to facilitate communication between the vehicle controllers 104 and to facilitate communication between the vehicle 102 and other devices of the network 100 via one or more internal and/or external networks, including one or more interconnected communication networks such as the Internet, a cable television distribution network, a satellite link network, a local area network, a wide area network, and a telephone network, as some non-limiting examples. As another example, the backbone controllers 106, e.g., the TCU 106-A and the SYNC controller 106-B, may each be configured to communicate via one or more of Bluetooth, Wi-Fi, and wired USB network connections and facilitate data transmission between the internal and/or external network and a mobile device (not shown), including, for example, remote requests received from one or more occupants of the vehicle 102.

The vehicle 102 may include a synchronous data link controller (SDLC) (hereinafter, gateway) 108, or a vehicle communication bus, configured to accommodate various methods of data exchange available between the vehicle controllers 104 located on at least one of the subnets 110, as well as between the vehicle controllers 104 of the subnets 110 and one or more backbone controllers 106, e.g., the TCU 106-A, SYNC controller 106-B, and so on, located on the backbone 112. The gateway 108 may be configured to facilitate communication using one or more of a vehicle controller area network (CAN), an Ethernet network, a media oriented system transfer (MOST) network, a FlexRay network, a local interconnect network (LIN), and so on.

As an example, a CAN message frame may include a plurality of fields, such as a start of frame (SOF) field, an arbitration field, a control field, a data field, a cyclic redundancy check (CRC) field, and an end of frame (EOF) field. The arbitration field may comprise a CAN message identifier bit string and a bit defining a message priority. The control field may include data defining the size of the data field. The vehicle controllers 104 and/or the backbone controllers 106 receiving a given message frame may reference the control field to identify how much data is included. The data field may include a predefined amount of information, such as 8 bytes, 64 bytes, or any other amount. In some examples, the data field may also be empty, e.g., include 0 bytes of information, and may define a remote frame comprising a request for a data frame. Other possibilities for a size and value of the data field are also contemplated. The CRC field may assist in providing data integrity and the EOF field may provide a notification to the vehicle 102 bus that the message is complete.

The arbitration field is fixed for a particular message. Each message has a unique message identifier, though multiple of the same messages may be sent over CAN. In one example, a CAN database may store definitions of all messages for a particular bus. The vehicle controllers 104 and the backbone controllers 106 on the network may be configured to access the CAN database for decoding the received message frames.

The priority identifier of the arbitration field may include a remote transmission request (RTR) bit. The RTR bit having a dominant state may designate a given message frame as a data frame and the RTR bit having a recessive state may designate a given message frame as a remote frame. The backbone controller 106 may send, to the vehicle controller 106, the remote frame requesting a data frame having the same message identifier as the remote frame. The gateway 108 may, accordingly, be configured to identify that a given data frame, e.g., message frame whose RTR bit is in a dominant state, received from the source controller and intended for receipt by the target controller is sent in response to a previously transmitted remote frame, e.g., message frame whose RTR bit is in a recessive state and whose message identifier matches the message identifier of the data frame.

In one example, the data field of a given CAN message frame may be 8 bytes long and may therefore limit sending message frames that are longer than a short string of characters or a single large number. The CAN messages defining data size that is larger than the data field may be separated into a plurality of CAN message frames. The individual CAN message frames may include values and bit locations within the original CAN message. The vehicle controller 104 and the backbone controller 106 may be configured to, in response to receiving the CAN message frames, query the CAN database to identify the location of each of the frames in the CAN message.

In one example, the gateway 108 may be configured to route data to and from the controllers 104 and the backbone controllers 106 using the corresponding subnets 110 and the backbone 112. The vehicle controllers 104 and the backbone controllers 106 may communicate with the gateway 108 using CAN communication protocol, such as, but not limited to, a high-speed (HS) CAN, a mid-speed (MS) CAN, and a low-speed (LS) CAN. One or more of the subnets 110 may define a main subnet, e.g., the backbone 112, comprising a portion of the network 100 configured to manage and route data traffic much heavier than the other subnets 110 and/or configured to serve as a joining point of communication for the other subnets 110 of the vehicle 102. The gateway 108 may, accordingly, be configured to transmit messages frames between the backbone controllers 106 located on the backbone 112, e.g., the TCU 106-A, the SYNC controller 106-B, and so on, and one or more of the vehicle controllers 104.

The gateway 108 may be configured to identify each of the controllers 104, 106 based on a corresponding physical network address. In response to receiving a request to route a message to a given controller 104, 106 the gateway 108 may query its own storage to identify a network address corresponding to the controller 104, 106. As described in further detail in reference to at least FIG. 2A, the gateway 108 may include a storage configured to store the network addresses, as well as, a routing schema defining which messages are routed to which subnets 110 and/or backbone 112 based on a predefined parameters included in the message, such as message type, identifiers of the controllers 104, 106 designated as source and/or target controllers, and so on.

Available vehicle 102 options and configurations may vary across makes, models, and trim levels of the vehicles 102, thus necessitating adjusting routing schemas corresponding to a given controller 104, 106 across different vehicle 102 makes and models. The in-vehicle routing between the plurality of the controllers 104 connected using the subnets 110 and/or between the controllers 104 connected using the subnets 110 and the backbone controllers 106 residing on the backbone 112 may be separately configured for each of the plurality of makes and models (or lines) of the vehicles 102. In one example, the controllers 104, 106 of a first line of the vehicles 102 may be connected to a plurality of subnets, nodes, or other network locations that are different from those with which the corresponding controllers 104, 106 are connected on a second line of the vehicles 102.

Figure 2A:
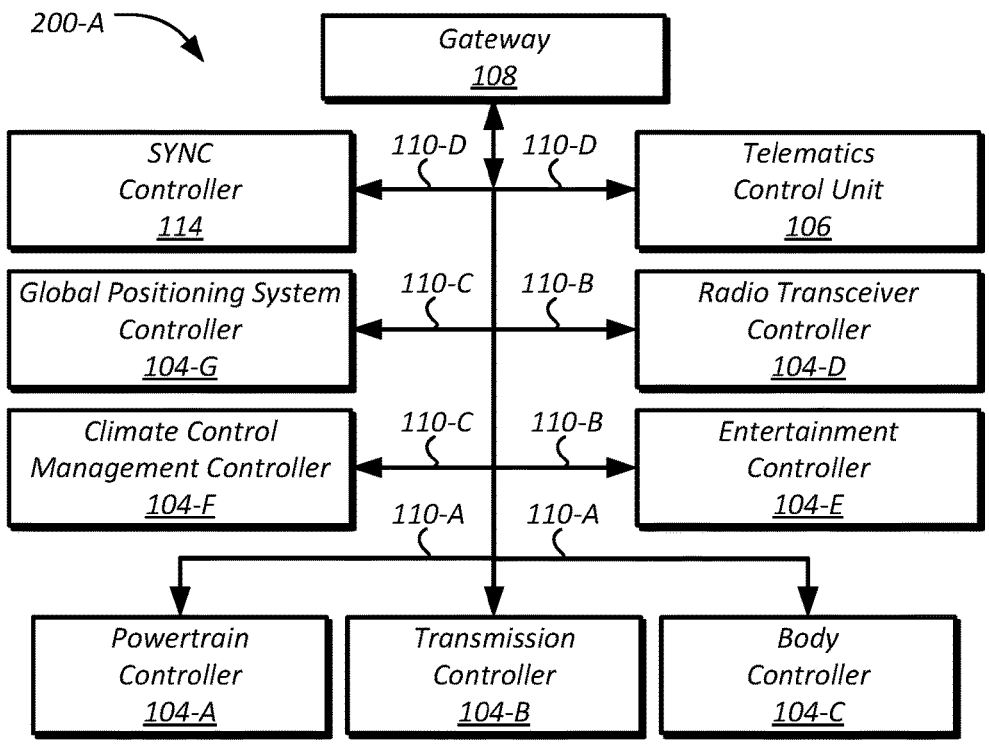
FIG. 2A is a block diagram illustrating an example communication network using an on-vehicle telematics protocol (OVTP)

FIG. 2A illustrates an example system 200-A for the gateway 108 configured to facilitate in-vehicle CAN communication using an on-vehicle telematics protocol (OVTP). In one example, the gateway 108 using the OVTP may be configured to perform message handling operations for the controllers 104, 106 without relying on a physical network address corresponding to the controller 104, 106. The gateway 108 may be configured, for instance, to designate a message to be delivered to a particular controller 104, 106 without having to reference a predefined routing schema stored in a storage (not shown) of the gateway 108.

The gateway 108 may be configured to use one or more methodologies to determine whether a controller designated as a receiving controller in a given message frame is located on the backbone 112 or on the subnet 110. The gateway 108 may be further configured to determine a particular one of the plurality of subnets 110 where the receiving controller 104 is located.

For example, the gateway 108 may be configured to implement communication over OVTP using a 29-bit message identifier and implement all other CAN communication using an 11-bit message identifier. The gateway 108 may thereby implement message routing based on a bit length of a network identifier, e.g., whether the message identifier of a given message is a 29-bit or an 11-bit message identifier. This may allow the controllers 104, 106 to recognize an OVTP-based request at a much lower layer in its protocol stack and ignore the message if the controller 104, 106 does not support OVTP.

Using the 29-bit message identifier may also permit the use of the OVTP protocol stack in parallel to a normal diagnostic request, thus allowing one or more of the controllers 104, 106 to maintain connectivity even when the vehicle 102 is in a diagnostic mode. This is in contrast to protocol implementations that exclusively rely on the 11-bit message identifiers, where being in a diagnostic mode, or otherwise activating an on-board diagnostics (OBD) port of the vehicle 102, may prevent communication with the controllers 104, 106 for other purposes, e.g., performing software updates.

Additionally or alternatively, each of the controllers 104 may be configured to communicate with one or more backbone controllers 106 located on the backbone 112 using a predefined subnet 110 regardless of where the controller 104 is located in the vehicle 102. Thus, a sender does not need to know or identify the physical location of the node and the subnet 110 on which the node resides before sending a message intended for that node. Meaning that the request or message frame from the sender is agnostic in reference to the address. The gateway 108, accordingly, may facilitate communication between the various controllers 104, 106 without knowing in advance the nodes with which the controllers 104, 106 are connected.

It may be said, for example, that the system 200-A permits a hardware routing numeric value to be applied to software abstraction layers in a controlled manner. This may allow for routing of data through various software layers without having to open up a payload. For example, the first several layers of the protocol stack may perform the routing, while the upper layers of the stack may be configured to check software validity based on the first byte. This may allow each layer of the hardware to leverage the hardware characteristics of design to maximize efficiency.

Figure 2B:
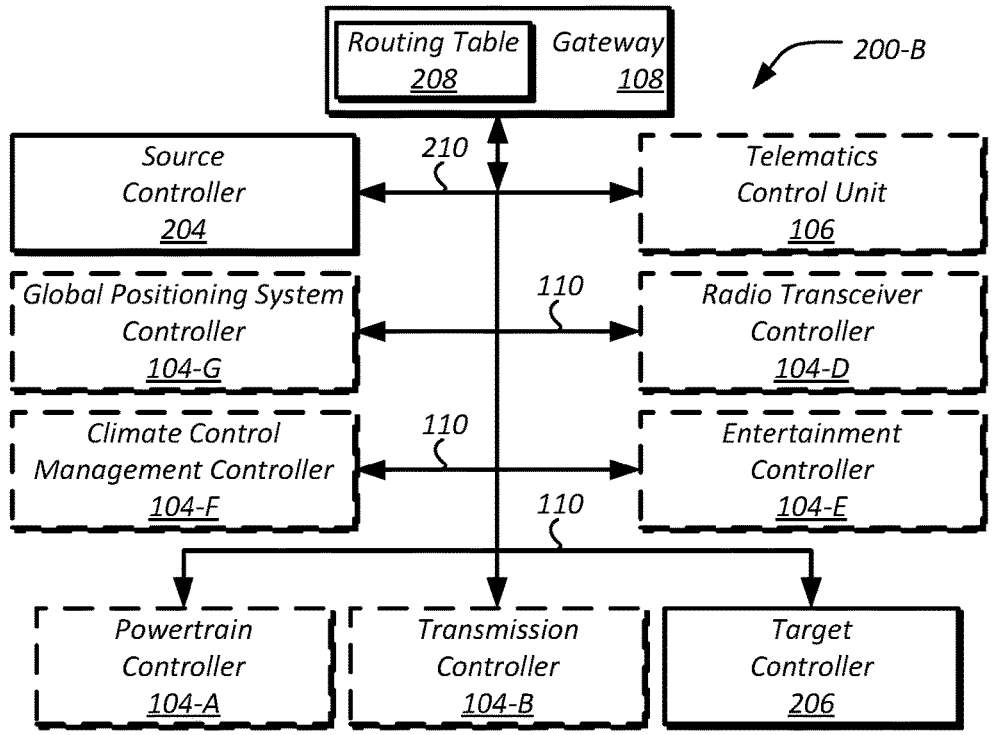
FIG. 2B is a block diagram illustrating an example system for sending and receiving a message frame using the OVTP.

FIG. 2B illustrates an example system 200-B for routing messages between the one or more controllers 104, 106 of the vehicle 102. As one example, the gateway 108 may be configured to route the received data messages between a source controller 204 located on a source network 210 and a target controller 206 using one or more of the subnets 110 and/or the backbone 112. In response to receiving a message frame, the gateway 108 may, accordingly, identify a source controller identifier, or a unique controller identifier corresponding to the controller 104 that sent the data message, and a target controller identifier, or a unique controller identifier corresponding to the controller 104 for which the received message is intended.

The source controller 204 and the target controller 206, as illustrated for example in FIG. 2B, indicate direction of a given data transmission, e.g., from source to target, as may be specified in the message identifier of the transmission. During a different data transmission relative positions of the source and target controllers 204, 206 with respect to one another and/or to the gateway 108 may be defined by the particular controller 104 sending the data message and the particular controller 104 receiving the data message and, therefore, may be same or different as the relative positions indicated in FIG. 2B. As described in further detail in reference to at least FIGS. 4A and 4B, the gateway 108 may include a routing table 208 linking the identified source and target controllers 204, 206 to one of the subnets 110 and/or the backbone 112 to which a given message frame may be routed.

Figure 3:
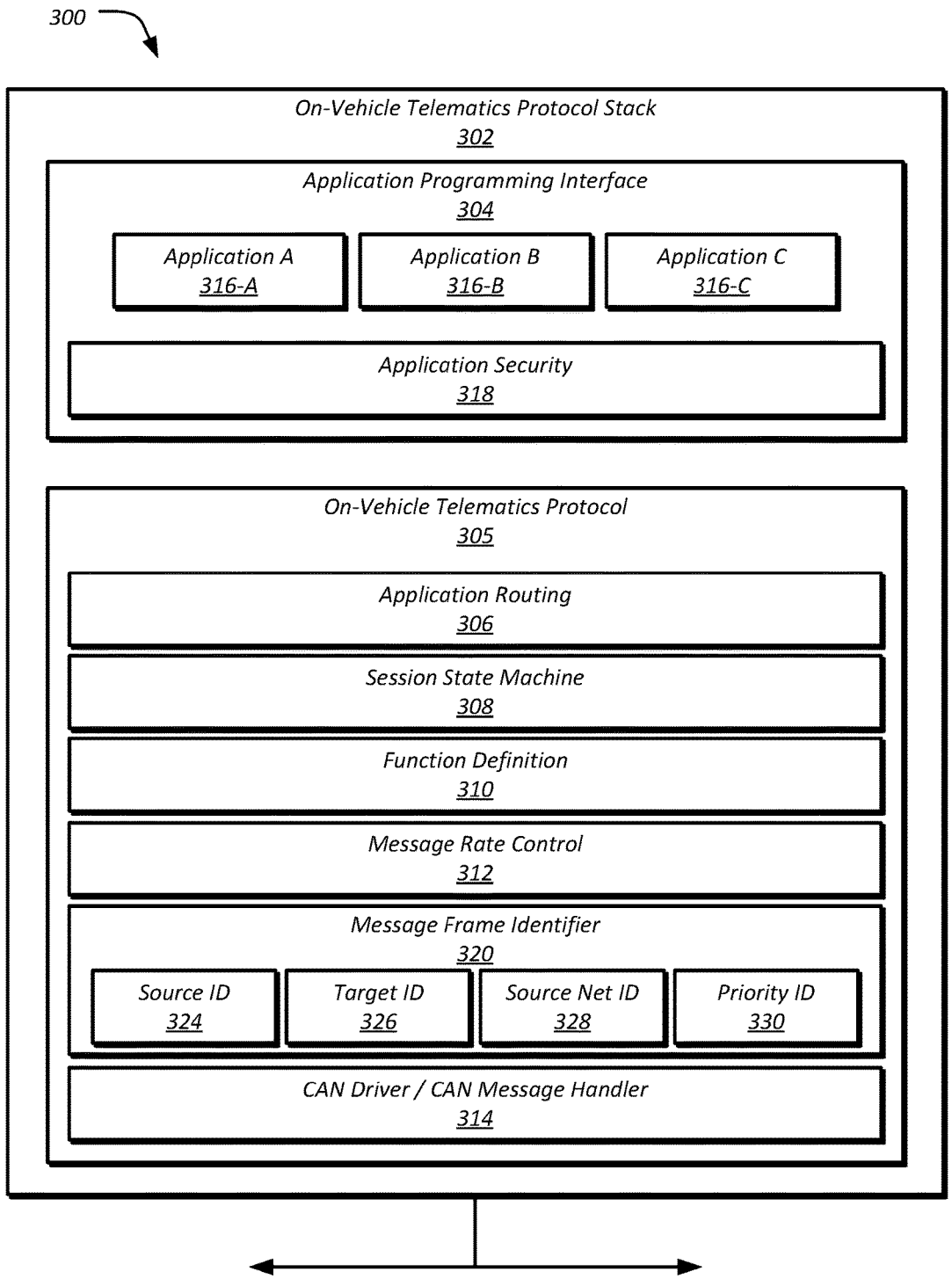
FIG. 3 is a block diagram illustrating an example protocol stack for the OVTP.

FIG. 3 shows an example implementation 300 of an OVTP protocol stack 302 for the controller 104, 106 configured to send and/or receive CAN messages including 29-bit message identifiers 320. The stack 302 may include an application programming interface (API) 304 and an OVTP protocol 305 having a plurality of networking software layers, such as, but not limited to, an application routing 306, a session state machine 308, a function definition 310, a message rate control 312, and a CAN driver 314.

Each of a plurality of applications 316 (shown generally as elements 316-A through 316-C) of the API 304 may include software instructions configured to be executed by a processor (not shown) of the controller 104, 106. In one example, the application 316 may be configured to receive data captured by a sensor connected to or in communication with the controller 104, 106 and to send the received data to another one of the controllers 104, 106 using a CAN message including the 29-bit message identifier 320. The API 304 is, thereby, configured to facilitate CAN communication between the applications 316 specific to the controller 104, 106 and those of the other controllers 104, 106 of the vehicle 102, as well as, with one or more devices (not shown) remote to the vehicle 102. In another example, the API 304 may be further configured to secure CAN communication data flow to and from the applications 316 using an application security layer 318.

The applications 316 that utilize the OVTP protocol 305 may be configured to send and receive CAN message frames including a plurality of fields, such as, but not limited to, the SOF field, the arbitration field, the control field, the data field, the CRC field, the ACK field, and the EOF field. The arbitration field of an extended CAN message frame may include a 29-bit message identifier 320 and may prioritize which of the nodes attempting to send a message will control the bus of the vehicle 102.

In one example, the identifier 320 may comprise a source controller identifier 324, a target controller identifier 326, a source network identifier 328, and a priority identifier 330. The source controller identifier 324 may define the controller 104, 106 sending the message, e.g., the source controller 204, the target controller identifier 326 may define the controller 104, 106 for which the message is intended, e.g., the target controller 206, the source network identifier 328 may define the source network 210 where the source controller 204 is located, and the priority identifier 330 may define a priority of transmitting a given CAN message to the target controller 104 relative to one or more vehicle 102 control signals.

The priority identifier 330 may define, for example, the priority of the messages relative to the diagnostic and control messages of the vehicle 102. As one example, the priority identifier 330 having a dominant state may designate a given message frame as a data frame and the priority identifier 330 having a recessive state may designate a given message frame as a remote frame. The gateway 108 may, accordingly, be configured to identify whether a given message frame is a data frame, e.g., message frame whose RTR bit is in a dominant state, or a remote frame, e.g., message frame whose RTR bit is in a recessive state. The gateway 108 may also be configured to identify, based on a combination of the priority identifier 330 state and detecting a match between corresponding message identifiers of the remote and data frames, that a given data frame has been sent in response to a previously transmitted remote frame.

The applications 316 of the controllers 104 may include, as some examples, an OTA application enabling interpretation of messages being routed under this application as over-the-air (OTA) software update messages and route the messages to a corresponding OTA-capable application of the controller 104, 106, a PARSED request response application enabling each controller 104, 106 to interpret messages being routed under this application as processing and reporting system for efficient data upload messages and route the messages to a corresponding application for handling, a PARSED push application that may include the functioning transmission of data based on an internal controller 104, 106 event and may be performed only when the PARSED application has been properly configured by the request-response component of the PARSED application.

The source controller identifier 324 may further define an originating controller 104, 106 for the OVTP message. In one example, the source controller identifiers 324 may further define controller identifiers stored in the routing table 208. Source controller identification 324 may allow multiple source controllers 204 to exchange message frames with multiple target controllers 206 simultaneously.

The target controller identifier 326 may define the controller 104, 106 for which the OVTP message is intended. In one example, for messages originating at a given controller 104, 106 the target controller identifier 326 may be defined as the target controller 206 that is receiving the information being transmitted. In another example, the target controller identifiers 326 may further define controller identifiers stored in the routing table 208. Inclusion of this parameter may allow for a hardware routing numeric value to be applied to software abstraction layers in a controlled manner. As one example, the controller 104, 106 detecting the CAN message may reference the target controller identifier 326 at the physical layer to determine whether the detected CAN message is intended for this or for another controller 104, thereby avoiding for the protocol 305 layers above the physical layer having to process the detected CAN message in order to determine the intended recipient controller 104, 106.

For example, a pair of controllers 104, 106 on the vehicle 102, such as the entertainment controller 104-E and the TCU 106-A, may each be connected to a wireless network and may be configured to communicate using CAN messaging. Each of the controllers 104, 106 may represent a unique subnet 110 and/or backbone 112 location defining a unique network address. The controllers 104, 106 may, accordingly, send and receive messages at the same time without conflicts of message transmission on the physical wire of the network. This may also allow for addition of the connected controllers 104, 106 without requiring architecture redesign.

The OVTP protocol 305 may use request-addressing such that a given controller 104, 106 may interpret a received request in accordance with one or more predefined parameters included in the request, e.g., a remote frame including an RTR bit in a recessive state and indicating a request for a corresponding data frame including the RTR bit in a dominant state and the same message identifier. In one example, the protocol 305 defined on the controller stack may be further configured to route a request to a particular application 316 of the controller 104, 106 to which the request is directed (or which will handle the request).

The session state machine 308 may be configured to reject unsecure or improperly encrypted requests, to allow the controller 104, 106 to release resources that may be in use for PARSED or OTA to other applications because a session is not active. The use of the state machine 308 may, accordingly, permit controlling bandwidth utilization of the vehicle 102 network remotely. The use of the state machine 308 may further provide a handshake requirement such that the server may confirm that the client is awake and ready to receive data.

The function definitions 310 may define functions that are utilized by various schema taking advantage of the 29-bit message identifier. For example, without limitation, over the air updates (OTA) have a defined set of available functions, and these function definition bits can reference a function associated with a message. The message rate control portion 312 may be configured to control transmission speed at which the one or more CAN frames defining a given OVTP message may be transmitted. The message rate control portion 312 may, accordingly, control a maximum bandwidth that will be used during a given transmission.

A given data message received by the gateway 108 may, accordingly, include the source controller identifier 324, e.g., 10 bits of the 29-bit message identifier 320, the target controller identifier 326, e.g., 10 bits of the 29-bit message identifier 320, and the priority identifier 330, e.g., 3 bits of the 29-bit message identifier 320. The OVTP protocol 305 may further include the CAN driver 314 configured to perform CAN message handling, thus allowing the controller 104, 106 to send and receive CAN messages, as well as, push the CAN messages onto the vehicle 102 CAN bus.

The addressing components, instead of being hardcoded, as in some instances, may be designed as logical constructs and may facilitate the use of the 10 source bits and the overall 20 source/target bits. This may allow for an application that provides mesh-based networking of controller 104, 106 messages across the entire network without conflict. This may also leverage the physical layers of the CAN protocol 305 design relative to other networks, which can allow for multiple senders and receivers on the same physical wire. The controller 104, 106 detecting the CAN message may reference the target controller identifier 326 at the physical layer to determine whether the detected CAN message is intended for this or for another controller 104, 106 thereby avoiding for the protocol layers above the physical layer having to process the detected CAN message intended for another controller 104, 106.

Figure 4A:
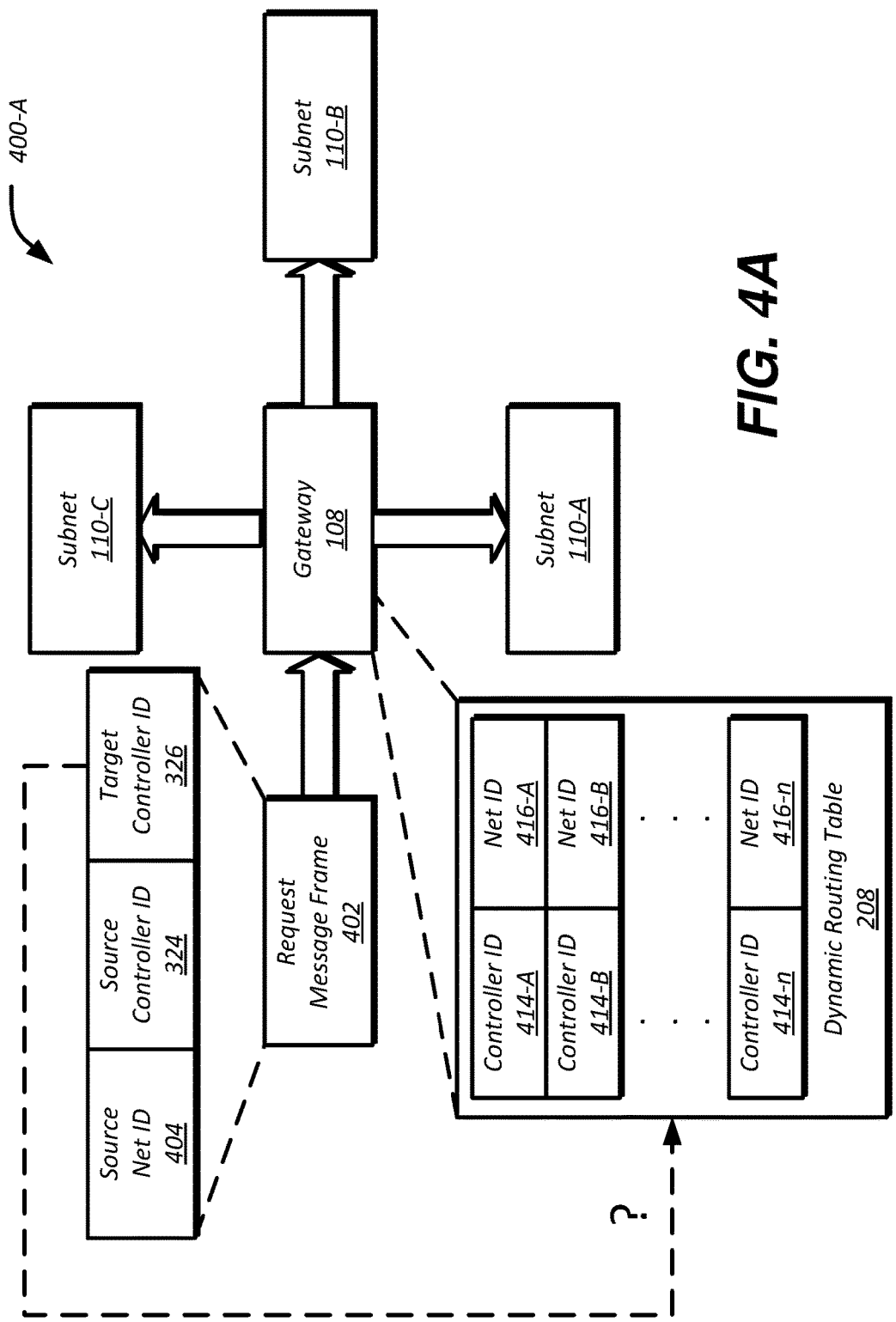
FIGS. 4A, 4B, and 4C are block diagrams illustrating an example system for updating a routing table based on a received response message frame.

FIG. 4A illustrates an example system 400-A including the gateway 108 configured to query the table 208 to route data messages between the controllers 104, 106, e.g., the source controller 204 and the target controller 206, based on network identifiers 416 linked to controller identifiers 414 of each of the respective controllers 104, 106. As one example, the gateway 108 may be configured to route message frames to one of the subnets 110 and/or backbone 112 corresponding to the network identifier 416 that is linked to the controller identifier 414 in the routing table 208.

In one example, the gateway 108 may receive, e.g., from the source controller 204, a request message frame 402 including a source controller network identifier (hereinafter, source network identifier) 404, a source controller identifier 324, and a target controller identifier 326. As described in reference to at least FIG. 2B, the source controller identifier 324 may be indicative of a unique identifier corresponding to the controller 104, 106 that sent the data message 402, e.g., the source controller 204. The controller 104, 106 from which the request message 402 originated may, accordingly, be located on the subnet 110 and/or backbone 112 corresponding to the source network identifier 404 of the data message 402. The target controller identifier 326 may be indicative of a unique identifier corresponding to the controller 104, 106 that is indicated as a recipient of the data message 402, e.g., the target controller 206.

The gateway 108 may query the routing table 208 to identify the network identifier 416 of the target controller identifier 326. In one example, the gateway 108 may be configured to identify the controller identifier 414 of the table 208 that matches the target controller identifier 326 and determine the network identifier 416 linked to the identified controller identifier 414. If the target controller identifier 326 is not linked to the network identifier 416, e.g., none of the controller identifiers 414 of the table 208 match the target controller identifier 326 and/or the identified controller identifier 414 does not have a linked network identifier 416, the gateway 108 may send the received request message 402 to all of the subnets 110 and/or backbone 112 of the vehicle 102.

Figure 4B:
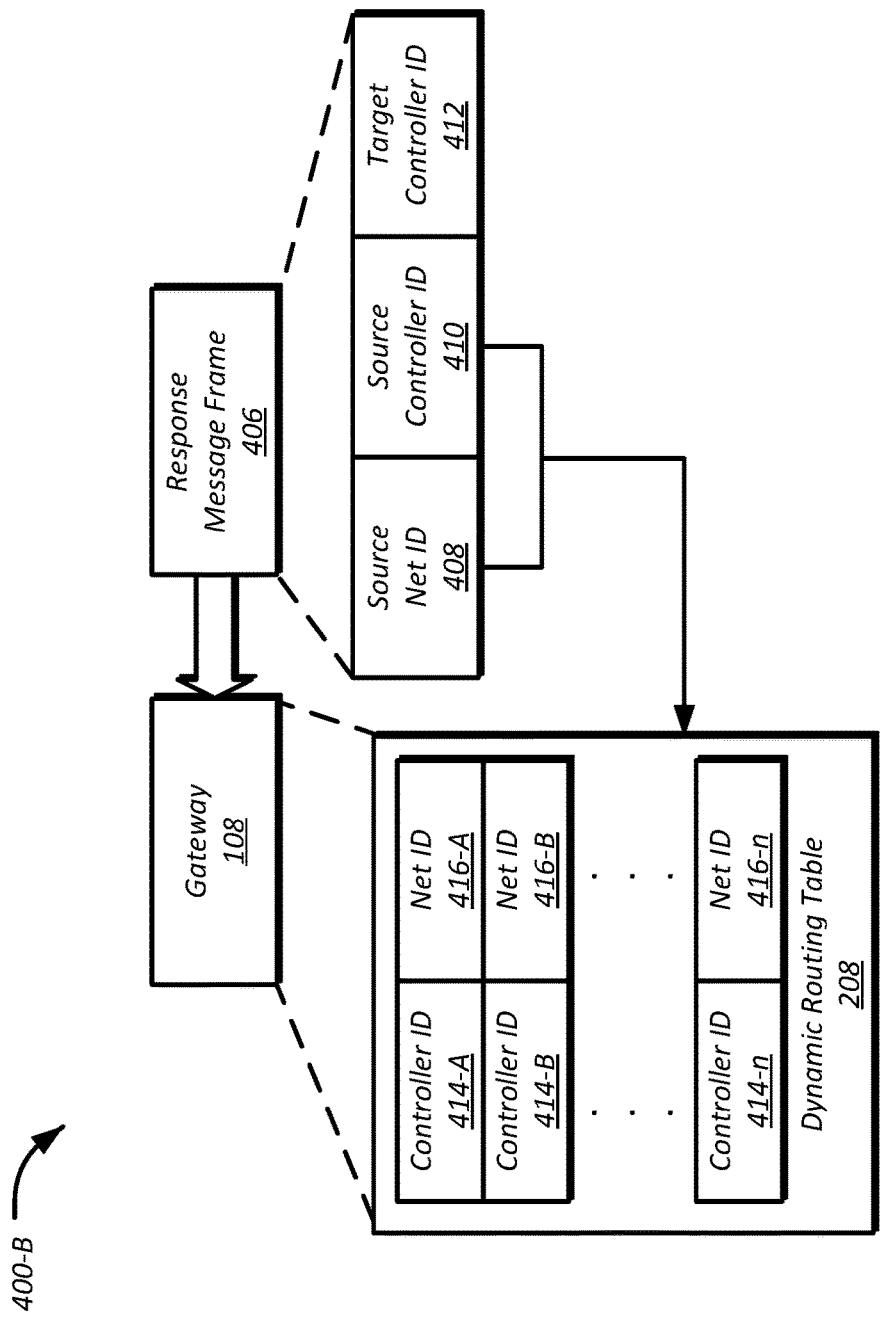

FIG. 4B illustrates an example system 400-B including the gateway 108 configured to receive a response message frame 406. As one example, the gateway 108 may receive the response message frame 406 in response to sending the received request message frame 402 to all subnets 110 and/or backbone 112 of the vehicle 102. The response message 406 may include an arbitration field having one or more identifiers, such as, but not limited to, a source controller network identifier (hereinafter, source network identifier) 408, a source controller identifier 410, and a target controller identifier 412.

In response to identifying the source controller identifier 410 and the target controller identifier 412 included in the response message 406, the gateway 108 may determine whether the source controller identifier 410 of the response message 406 corresponds to the target controller identifier 326 of the request message 402. The gateway 108 may be further configured to determine whether the target controller identifier 412 of the response message 406 corresponds to the source controller identifier 324 of the request message 402.

In response to determining that the response message 406 originated from the controller 104, 106 that was the intended recipient, e.g., the target controller 206, of the prior request message 402, the gateway 108 may update corresponding fields of the routing table 208 to designate the source network identifier 408 as corresponding to the source controller identifier 410 of the response message 406. In one example, the gateway 108 updates the corresponding fields of the routing table 208 in response to detecting a match between the target controller identifier 412 and the source controller identifier 324 in addition to the match between the source controller identifier 410 and the target controller identifier 326. Accordingly, in response to a subsequent message frame that specifies the unique string of the source controller identifier 410 as the target controller identifier 326, the gateway 108 may query the routing table 208 and send the message frame to the subnet 110 corresponding to the network identifier 416 linked to the controller identifier 414.

Additionally or alternatively, the response message 406 may include the priority identifier (not shown) having a recessive state, such that the gateway 108 may identify the response message 406 as the data frame transmitted in response to a previously broadcasted remote frame having the same message identifier 320.

Figure 4C:
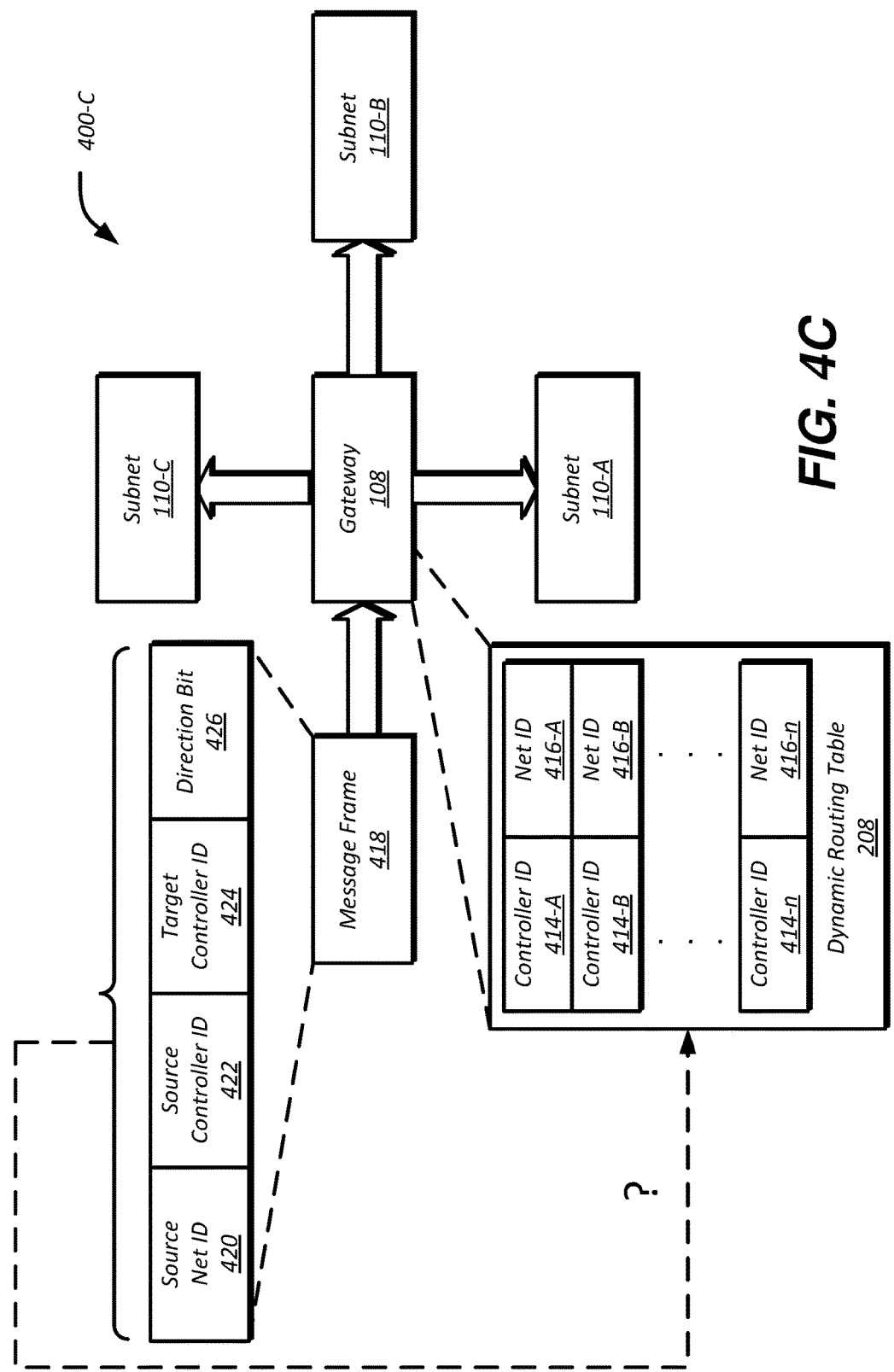

FIG. 4C illustrates an example system 400-C including the gateway 108 configured to receive a message frame 418 that is not identified as either a request frame or a response frame. The gateway 108 may be configured to determine, based on one or more of a source network identifier 420, a source controller identifier 422, a target controller identifier 424, and a direction bit 426, whether the received message frame 418 is a request frame or a response frame.

In response to determining whether the received message frame 418 is a request frame or a response frame, the gateway 108 may be further configured to send the received message frame 418 to one or more of the subnets 110 and backbone 112. The gateway 108 may, in one example, route the received message frame 418 according to one or more values stored in the routing table 208. In another example, the gateway 108 may be configured to update the routing table 208 to link the controller identifier 414 of the source or target controller 204, 206 to the network identifier 416 of the subnet 110 or backbone 112 where the controller 204, 206 is located, prior to routing the received message frame 418 according to the routing table 208.

Figure 5:
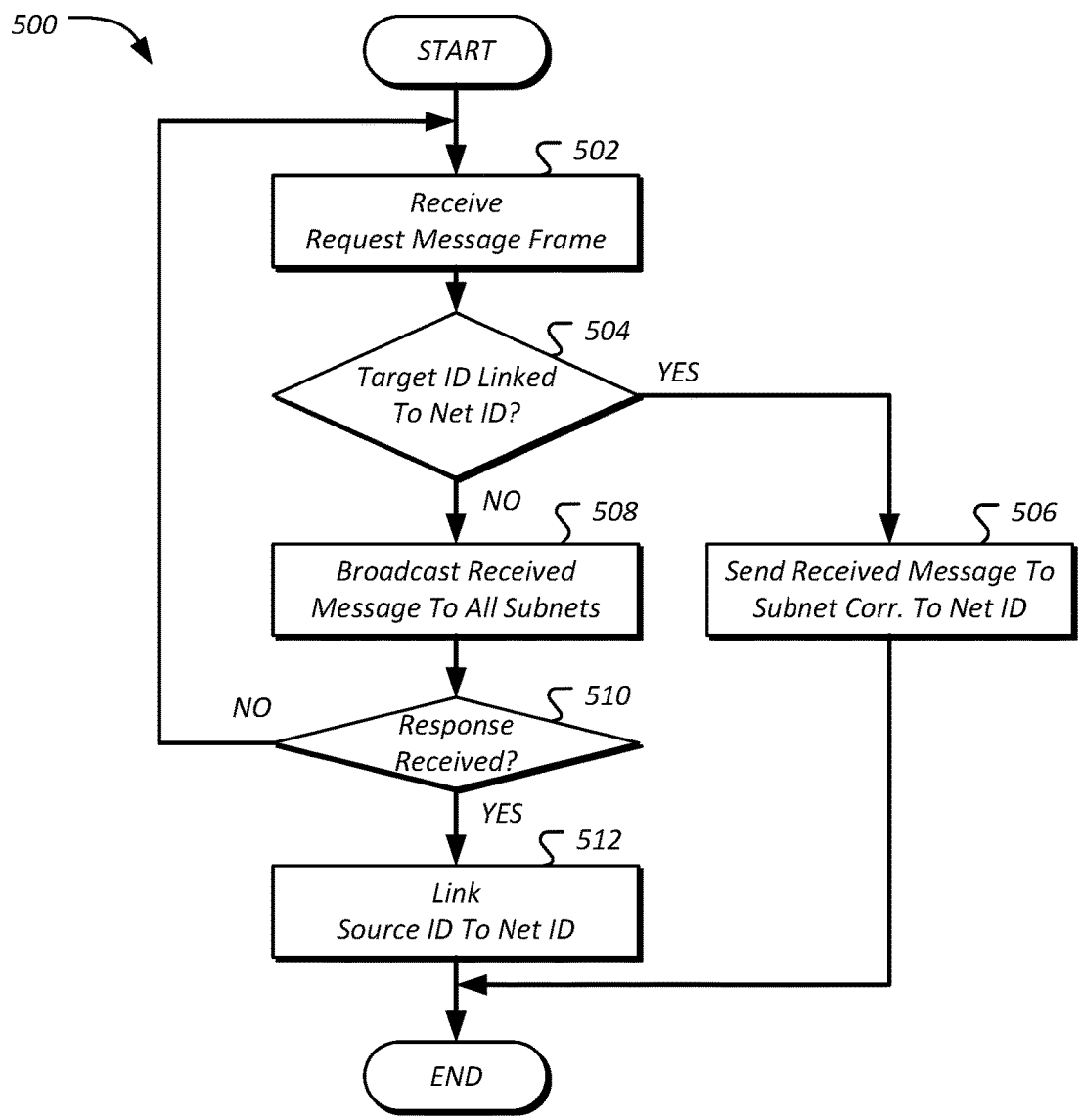
FIG. 5 is a flowchart illustrating an algorithm for updating the routing table in response to receiving the response message frame.

In reference to FIG. 5, an example process 500 for updating the routing table 208 in response to receiving a response message frame. The process 500 may begin, at operation 502, where the gateway 108 receives the request message frame 402, including the source network identifier 404, the source controller identifier 324, and the target controller identifier 326 corresponding to the source network 210, the source controller 204, and the target controller 206, respectively. The gateway 108 queries the routing tables 208, at operation 504, to determine whether the target controller identifier 326 matches one of the controller identifiers 414. The process 500 may proceed to operation 508 if the target controller identifier 326 does not match any of the controller identifiers 414 of the routing table 208.

If the gateway 108 identifies the controller identifier 414 that matches the target controller identifier 326, the gateway 108 may then determine whether the matching controller identifier 414 is linked to the network identifier 416 that matches the source network identifier 404 of the received message frame 402. In response to confirming that the controller identifier 414 is linked to the network identifier 416 and/or that the linked network identifier 416 matches the source network identifier 404, the gateway 108, at operation 506, transmits the received request message frame 402 to the subnet 110 corresponding to that network identifier 416 for receipt by the target controller 206.

The gateway 108 broadcasts the received request message frame 402 to all the subnets 110 of the vehicle 102, at operation 508, in response to determining, at operation 504, that the target controller identifier 326 of the message frame 402 is not linked to the network identifier 416 in the routing table 208.

At operation 510, the gateway 108 determines whether the response message frame 406 has been received. In one example, for a predetermined period of time after broadcasting the received request message frame 402 to all subnets 110 of the vehicle 102, the gateway 108 may analyze subsequently received message frames to determine whether it may be the response message frame 406. The gateway 108 may, for example, determine whether the source controller identifier 410 of the received response message frame 406 matches the target controller identifier 326 of the previously received request message frame 402. In another example, the gateway 108 may further determine whether the target controller identifier 412 of the received response message frame 406 matches the source controller identifier 324 of the previously received request message frame 402.

If the response message frame 406 has not be received, e.g., the gateway 108 determines that the target and/or source controller identifiers of the request and response message frames 402, 406 do not match, the process 500 may return to operation 502 where the gateway 108 may receive the request message frame 402.

At operation 512, the gateway 108 links the source network identifier 408 of the response message frame 406 and the source controller identifier 410 in response to determining that the source controller identifier 410 of the received response message frame 406 matches the target controller identifier 326 of the previously received request message frame 402 and/or determining that the target controller identifier 412 of the received response message frame 406 matches the source controller identifier 324 of the previously received request message frame 402. At this point the process 500 may end. In some examples, the process 500 may be repeated in response to receiving the request message frame 402 or in response to another signal or request.

FIGS. 6A-6D illustrate example processes 600-A through 600-D, respectively, for updating the routing table 208 in response to receiving a message frame. As one example, the process 600-A illustrated in FIG. 6A may begin, at operation 602, where the gateway 108 receives the message frame 418 including the source network identifier 420, the source controller identifier 422, and the target controller identifier 424, each identifying, respectively, the source network 210, the source controller 204, and the target controller 206.

The received message frame may further include the direction bit 426 configured to have a state of either "0" defining a request message frame or "1" defining a response message frame. The request message frame may indicate that the message frame 418 was sent from the backbone controller 106 located on the backbone 112 to the vehicle controllers 104 located on one of the subnets 110. The response message frame may, accordingly, indicate that the message frame 418 was sent from the vehicle controllers 104 to the backbone controllers 106 located on the backbone 112.

At operation 604, the gateway 108 determines whether the state of the direction bit 426 is "1." In response to detecting that the state of the direction bit 426 is "1," the gateway 108 may identify the received message frame 418 as a response frame sent from one of the subnets 110 to the backbone 112. The gateway 108, at operation 606, may query the routing table 208 to determine whether one of the controller identifiers 414 matches the source controller identifier 422 of the received message frame 418 and, if so, whether it is linked to the network identifier 416 that matches the source network identifier 420 of the received message frame 418. The process 600-A may proceed to operation 610 if the source controller identifier 422 matches one of the controller identifiers 414 of the routing table 208 and the corresponding identifier 416 matches the source network identifier 420.

In response to detecting that the matching controller identifier 414 is not linked to the network identifier 416 (or linked to the network identifier 416 that is different from the source network identifier 420), the gateway 108, at operation 608, links the source controller identifier 422 and the source network identifier 420, such that the matching controller identifier 414 is linked to the network identifier 416 that matches the source controller identifier 422. At operation 610, the gateway 108 sends the received message frame 418 to the backbone 112 to be received by one or more of the backbone controllers 106.

In response to detecting, at operation 604, that the state of the direction bit 426 is "0," the gateway 108 may identify the received message frame 418 as a request frame sent from the backbone 112 to one of the subnets 110. The gateway 108, at operation 612, may query the routing table 208 to determine whether one of the controller identifiers 414 matches the target controller identifier 424 of the received message frame 418 and, if so, whether it is linked to the network identifier 416.

In response to detecting that the matching controller identifier 414 is not linked to the network identifier 416 (or that the target controller identifier 424 does not match any of the controller identifiers 414 of the table 208), the gateway 108, at operation 614, broadcasts the received message frame 418 to all the subnets 110 of the vehicle 102. In response to confirming that the controller identifier 414 that matches the target controller identifier 424 is linked to the network identifier 416, the gateway 108, at operation 616, transmits the received message frame 418 to the subnet 110 corresponding to the linked network identifier 416 for receipt by the target controller 206. At this point the process 600-A may end. In some examples, the process 600-A may be repeated in response to receiving the message frame 418 or in response to another signal or request.

Figure 6A:
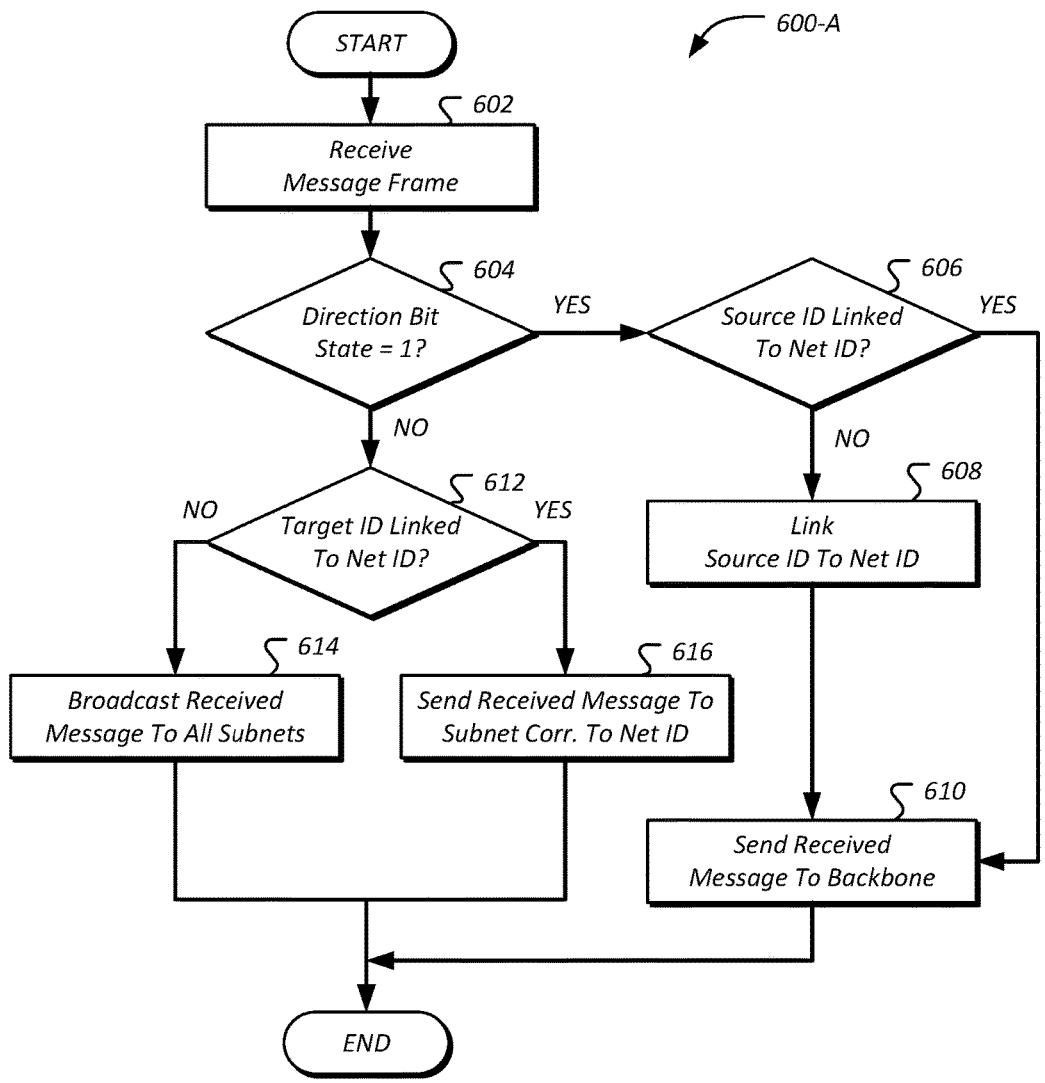
FIGS. 6A, 6B, 6C, and 6D are flowcharts illustrating algorithms for routing the received message frame based on a determination whether the frame is a request frame or a response frame.
Figure 6B:
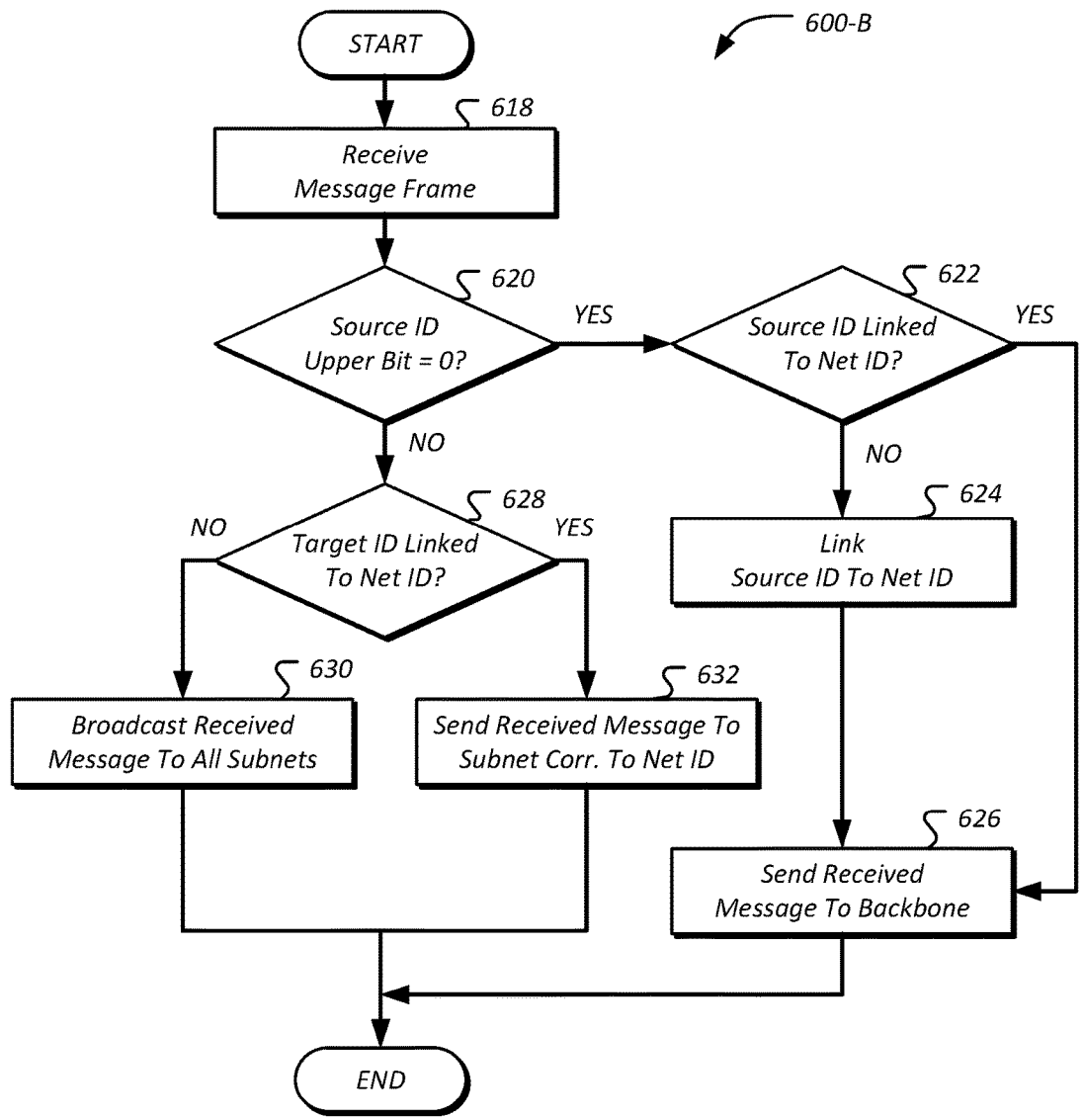

As another example, the process 600-B illustrated in FIG. 6B may begin, at operation 618, where the gateway 108 receives the message frame 418 including the source network identifier 420, the source controller identifier 422, and the target controller identifier 424, each identifying, respectively, the source network 210, the source controller 204, and the target controller 206.

The gateway 108, at operation 620, determines whether the upper bit of the source controller identifier 422 is a predefined value. In one example, the gateway 108 may determine that the source controllers 204 whose identifiers 422 have the upper bit of "0" are located on the subnets 110 and, therefore, the received message frame 418 defines a response message frame sent from the vehicle controller 104 to the backbone controllers 106 of the backbone 112. In another example, the gateway 108 may determine that the source controllers 204 whose identifiers 422 have the upper bit that is not "0," e.g., a value other than "0," are located on the backbone 112, and the received message frame 418, thus, defines a request message frame sent from the backbone controllers 106 to one or more of the vehicle controllers 104 located on the subnets 110.

In response to determining that the upper bit of the source controller identifier 422 is "0," the process 600-B proceeds to operations 622, 624, and 626, as previously described, for example, in reference to operations 606, 608, and 610, respectively, illustrated in FIG. 6A. The process 600-B may proceed to operations 628, 630, and 632, as previously described, for example, in reference to operations 612, 614, and 616, respectively, illustrated in FIG. 6A, in response to determining that the upper bit of the source controller identifier 422 is not "0."

Figure 6C:
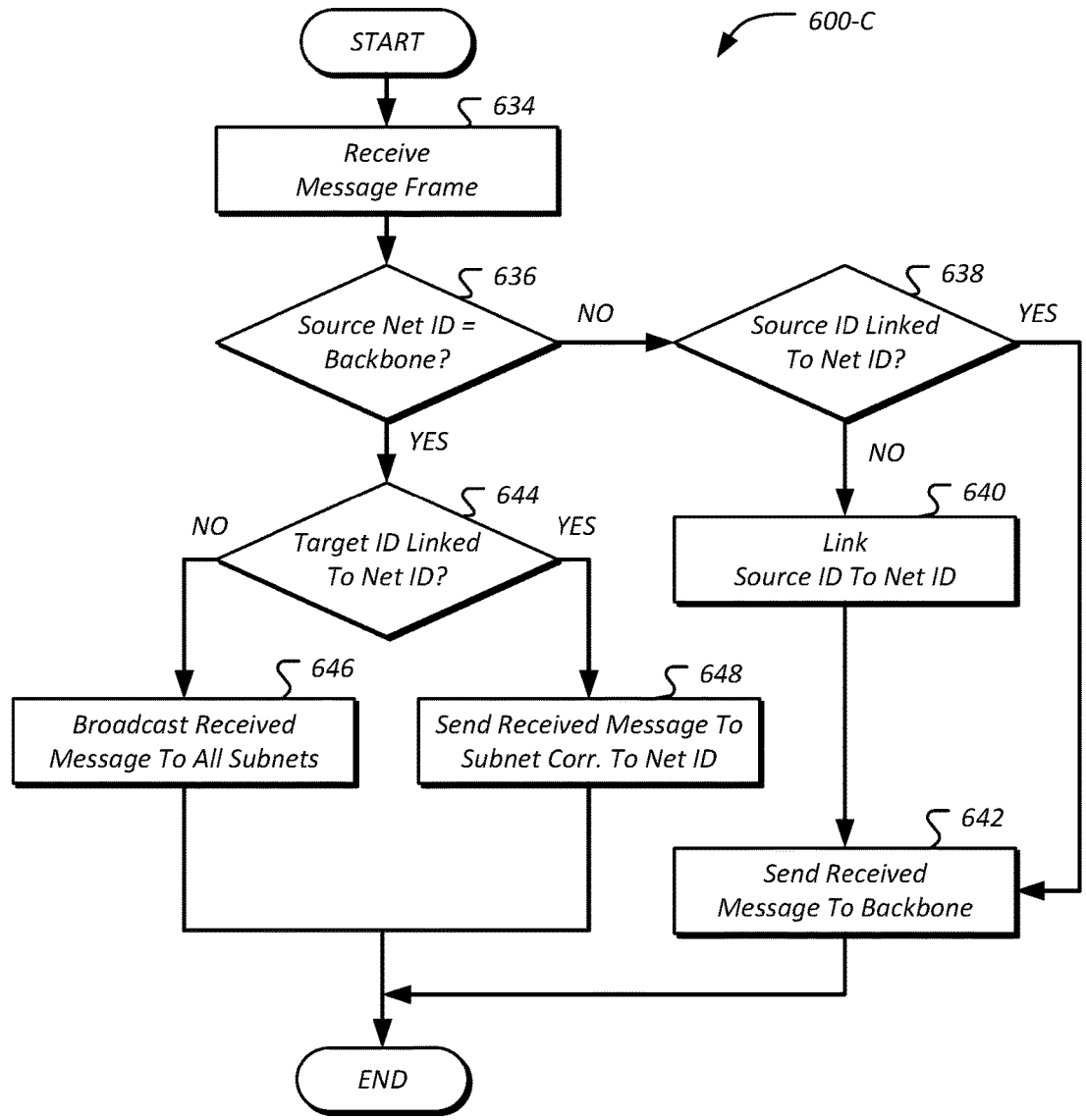

As still another example, the process 600-C illustrated in FIG. 6C may begin, at operation 634, where the gateway 108 receives the message frame 418 including the source network identifier 420, the source controller identifier 422, and the target controller identifier 424, each identifying, respectively, the source network 210, the source controller 204, and the target controller 206.

The gateway 108, at operation 636, determines whether the source network identifier 420 is a predefined value. In one example, the gateway 108 may determine that the source network identifiers 420 having a predefined value define the backbone 112 and, therefore, the received message frame 418 comprises a request message frame sent from the backbone controllers 106 to one or more of the vehicle controllers 104 located on the subnets 110. In another example, the gateway 108 may determine that the source network identifiers 420 having a value other than the predefined value define the subnets 110 and the received message frame 418, thus, comprises a response message frame sent from the vehicle controller 104 to the backbone controllers 106 of the backbone 112.

In response to determining that the received message frame 418 is a response message frame, e.g., the source network identifier 420 has a value other than the predefined value identifying the backbone 112, the process 600-C proceeds to operations 638, 640, and 642, as previously described, for example, in reference to operations 606, 608, and 610, respectively, illustrated in FIG. 6A. The process 600-C may proceed to operations 644, 646, and 648, as previously described, for example, in reference to operations 612, 614, and 616, respectively, illustrated in FIG. 6A in response to determining the received message frame 418 is a request message frame, e.g., the source network identifier 420 has a predefined value defining the backbone 212.

Figure 6D:
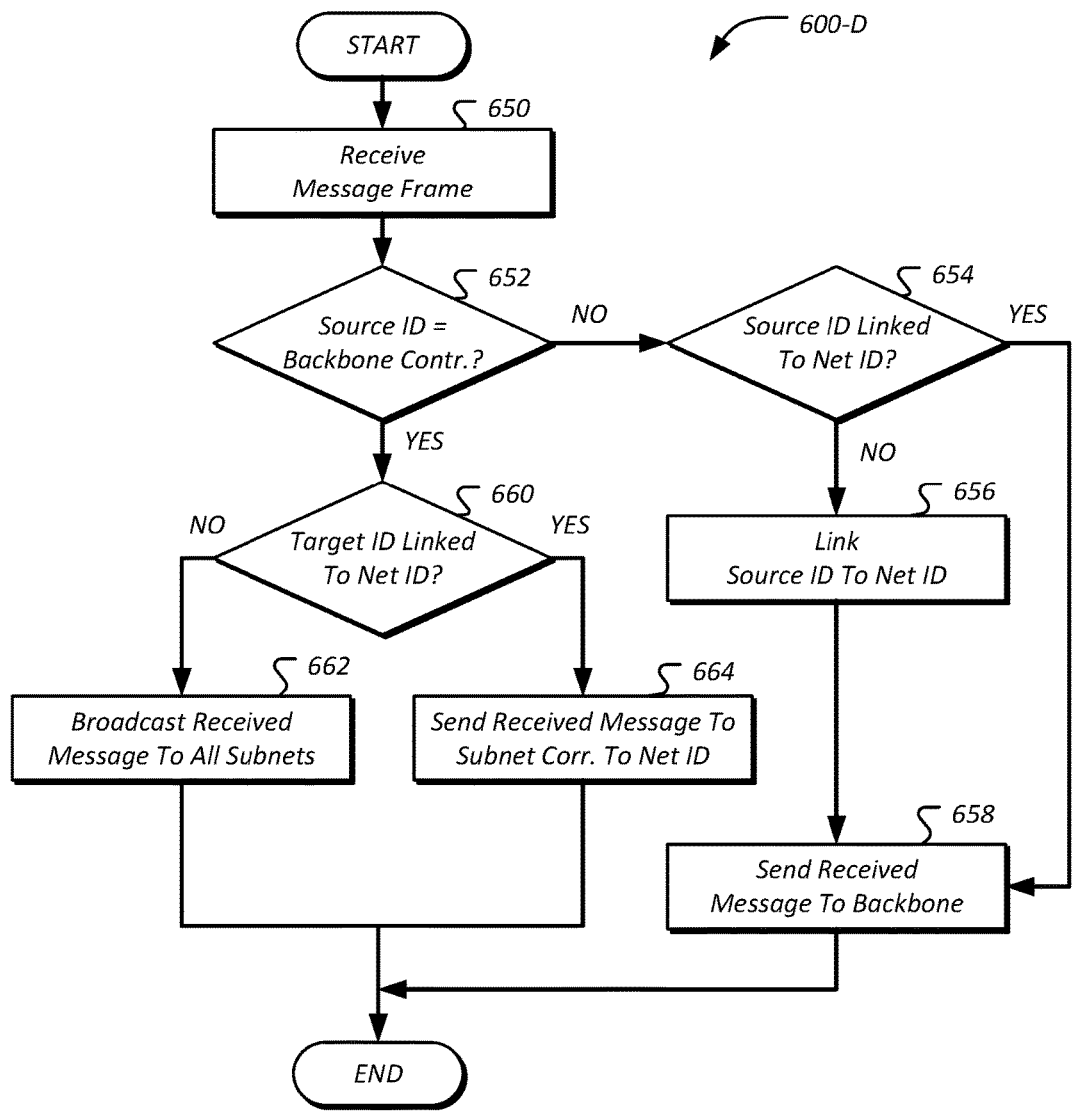

As yet another example, the process 600-D illustrated in FIG. 6D may begin, at operation 650, where the gateway 108 receives the message frame 418 including the source network identifier 420, the source controller identifier 422, and the target controller identifier 424, each identifying, respectively, the source network 210, the source controller 204, and the target controller 206.

The gateway 108, at operation 652, determines whether the source controller identifier 422 defines one of the backbone controllers 106. In one example, the gateway 108 may determine that the source controller identifiers 422 defining the backbone controllers 106 and, therefore, the received message frame 418 comprises a request message frame sent from the backbone controllers 106 to one or more of the vehicle controllers 104 located on the subnets 110. In another example, the gateway 108 may determine that the source controller identifiers 422 that do not define the backbone controllers 106 define, instead, the vehicle controllers 104 and the received message frame 418, thus, comprises a response message frame sent from the vehicle controller 104 to the backbone controllers 106 of the backbone 112.

In response to determining that the received message frame 418 is a response message frame, e.g., the source controller identifier 422 does not define the backbone controller 106 and instead defines the vehicle controller 104, the process 600-D proceeds to operations 654, 656, and 658, as previously described, for example, in reference to operations 606, 608, and 610, respectively, illustrated in FIG. 6A. The process 600-D may proceed to operations 660, 662, and 664, as previously described, for example, in reference to operations 612, 614, and 616, respectively, illustrated in FIG. 6A in response to determining the received message frame 418 is a request message frame, e.g., the source controller identifier 422 defines the backbone controller 112.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
    a gateway including a database and configured to transfer messages between a plurality of controllers, each controller connected to one of a plurality of nodes, the gateway further configured to:
        broadcast, to all the nodes, a request message received from a first controller for receipt by a second controller;
        receive, from a first node, a response message from the second controller for receipt by the first controller; and
        link, in the database, the first node and the second controller.

2. The system of claim 1, wherein the gateway is further configured to, in response to receiving a subsequent request message directed to the second controller, query the database to identify the first node linked to the second controller and send the subsequent request message to the second controller using the first node.

3. The system of claim 1, wherein, prior to broadcasting, the gateway is further configured to identify a received message as the request message based on one of a state of a direction bit included with the received message or a value of an upper bit of an identifier of the first controller included with the received message.

4. The system of claim 3, wherein the gateway is further configured to identify the received message as the request message in response to one of the state of the direction bit being zero or the value of the upper bit being not equal to zero.

5. The system of claim 1, wherein, prior to broadcasting, the gateway is further configured to identify a received message as the request message based on one of a node identifier of the node connecting the first controller or a first controller identifier of the first controller.

6. The system of claim 5, wherein the gateway is further configured to identify the received message as the request message in response to one of the node identifier defining the first node as a backbone or the first controller identifier defining the first controller as the controller connected to the backbone.

7. The system of claim 1, wherein, in response to broadcasting and prior to linking, the gateway is further configured to identify a received message as the response message in response to one of a state of a direction bit included with the received message being one or a value of an upper bit of an identifier of the first controller included with the received message being equal to zero.

8. The system of claim 1, wherein the request message includes a data request sent by the first controller connected to the node that defines a backbone and the response message includes a data message sent by the second controller connected to the node that defines a subnet.

9. A method comprising:
broadcasting, to all vehicle network nodes, each connecting one of a plurality of controllers, a request message received from a first controller and directed to a second controller;
receiving, from a first node, a response message sent by the second controller and directed to the first controller; and
linking the first node to the second controller.

10. The method of claim 9 further comprising, in response to receiving a subsequent request message directed to the second controller, query the database to identify the first node linked to the second controller and send the subsequent request message to the second controller using the first node.

11. The method of claim 9 further comprising, prior to the broadcasting, identifying a received message as the request message based on one of: a state of a direction bit included with the received message or a value of an upper bit of an identifier of the first controller included with the received message.

12. The method of claim 11, wherein the identifying of the received message as the request message is in response to one of the state of the direction bit being zero or the value of the upper bit being not equal to zero.

13. The method of claim 9 further comprising, prior to the broadcasting, identifying a received message as the request message based on one of a node identifier of the node connecting the first controller or a first controller identifier of the first controller.

14. The method of claim 13, wherein the identifying of the received message as the request message is in response to one of the node identifier defining the first node as a backbone or the first controller identifier defining the first controller as the controller connected to the backbone.

15. The method of claim 9 further comprising, in response to broadcasting and prior to linking, identifying a received message as the response message in response to one of a state of a direction bit included with the received message being one or a value of an upper bit of an identifier of the first controller included with the received message being equal to zero.

16. The method of claim 9, wherein the request message includes a data request sent by the first controller connected to the node that defines a backbone and the response message includes a data message sent by the second controller connected to the node that defines a subnet.

17. A system for a vehicle comprising:
a gateway controller connected, via nodes, to a pair of a plurality of vehicle controllers to transfer request and response message frames therebetween and configured to:
receive, from a first controller, the request message frame directed to a second controller;
query a database to identify the node connected to the second controller and linked, in the database, to the second controller based on a previously received response message frame from the second controller; and
send the request message frame to the identified node.

18. The system of claim 17, wherein the identified node is linked to the second controller in response to one of: a state of a direction bit included with the previously received response message frame being one or a value of an upper bit of an identifier of the second controller included with the prior response message frame being equal to zero.

19. The system of claim 17, wherein the identified node is linked to the second controller in response to one of: a first node connecting the second controller defining a subnet or the second controller defining the controller connected to the subnet.

20. The system of claim 17, wherein the request message includes a data request sent by the first controller connected to a first node that defines a backbone and the previously received response message includes a data message sent by the second controller connected to a second node that defines a subnet.

* * * * *